(12) United States Patent
Dhillon et al.

(10) Patent No.: US 10,839,245 B1
(45) Date of Patent: Nov. 17, 2020

(54) STRUCTURED DOCUMENT ANALYZER

(71) Applicant: Amazon Technologies, Inc., Seattle, WA (US)

(72) Inventors: Guneet Singh Dhillon, Pasadena, CA (US); Vijay Mahadevan, Los Angeles, CA (US); Yuting Zhang, Pasadena, CA (US); Meng Wang, Seattle, WA (US); Gangadhar Payyavula, Seattle, WA (US); Viet Cuong Nguyen, Pasadena, CA (US); Rahul Bhotika, Bellevue, CA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 16/364,022

(22) Filed: Mar. 25, 2019

(51) Int. Cl.
*G06K 9/00* (2006.01)
*G06K 9/46* (2006.01)
*G06K 9/62* (2006.01)

(52) U.S. Cl.
CPC .......... *G06K 9/46* (2013.01); *G06K 9/6262* (2013.01); *G06K 2209/01* (2013.01)

(58) Field of Classification Search
CPC ..... G06K 9/46; G06K 9/6262; G06K 2209/01
USPC ....................................................... 382/156
See application file for complete search history.

(56) References Cited

U.S. PATENT DOCUMENTS

| | | | | |
|---|---|---|---|---|
| 5,321,768 A * | 6/1994 | Fenrich | ..................... | G06K 9/34 382/178 |
| 7,646,921 B2 * | 1/2010 | Vincent | .............. | G06K 9/00463 382/225 |
| 7,650,035 B2 * | 1/2010 | Vincent | .............. | G06K 9/00463 382/225 |
| 7,697,758 B2 * | 4/2010 | Vincent | .............. | G06K 9/00463 382/177 |
| 8,111,927 B2 * | 2/2012 | Vincent | .................... | G06K 9/03 382/225 |
| 8,335,789 B2 * | 12/2012 | Hull | ........................ | G06F 21/78 707/736 |
| 9,104,940 B2 * | 8/2015 | Wu | ........................ | G06K 9/344 |
| 9,443,494 B1 * | 9/2016 | Parish | .................... | G09G 5/373 |
| 9,552,516 B2 * | 1/2017 | Janssen, Jr. | ........... | G06F 40/211 |
| 10,127,673 B1 * | 11/2018 | Ben Khalifa | ...... | G06K 9/00463 |
| 10,521,477 B1 * | 12/2019 | Wells | .................. | G06F 16/9038 |
| 10,628,633 B1 * | 4/2020 | Geng | .................... | G06F 3/0482 |

* cited by examiner

*Primary Examiner* — Jonathan S Lee
(74) *Attorney, Agent, or Firm* — Robert C. Kowert; Kowert, Hood, Munyon, Rankin & Goetzel, P.C.

(57) ABSTRACT

A structured document analyzer that associates keys and values in structured documents based on key, value, and key-value container bounding boxes. A trained machine learning model analyzes images of structured documents to determine bounding boxes for keys, values, and key-value containers in the images with confidence scores for the classifications. For each image, duplicate bounding boxes are removed, and then a set of key-value containers are selected and sorted based on the confidence scores. For each key-value container, a best key and value are determined for the container based on overlap of the key and value bounding boxes with the container bounding box and the confidence scores. Optical character recognition may be performed on the image to determine text for the keys and values.

20 Claims, 18 Drawing Sheets

| Key-value pairs | |
|---|---|
| Name | <Name string> |
| Address | <Address string> |
| Phone | <Phone number> |
| Email | <Email address> |
| Company | <Company name> |
| . | . |
| . | . |
| . | . |

STRUCTURED DOCUMENT ANALYZER

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

BRIEF DESCRIPTION OF THE DRAWINGS

FIG. 4 illustrates example output of a structured document analysis system, according to some embodiments.

Figure 1A:
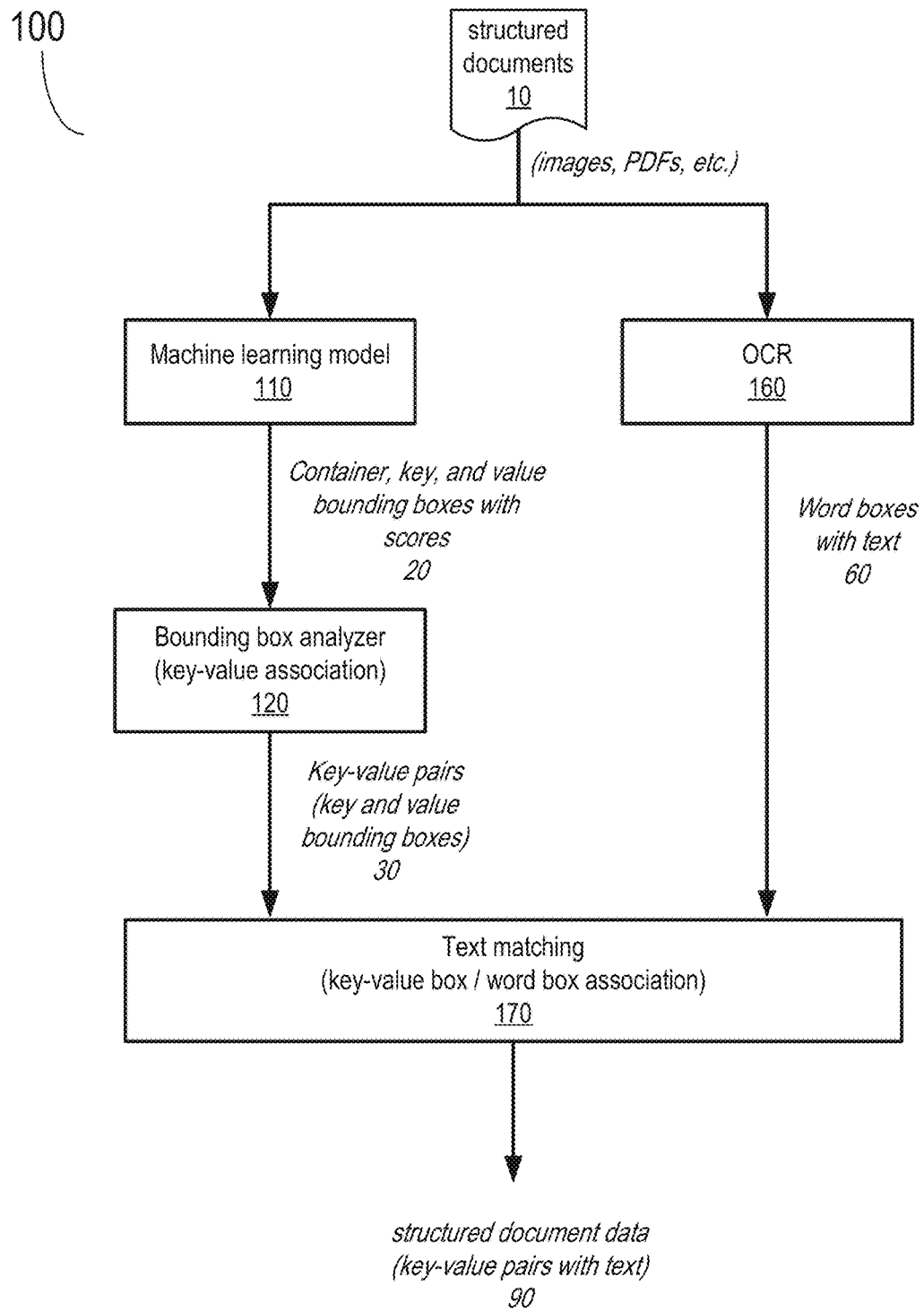
FIGS. 1A through 1E illustrate a structured document analysis system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for structured document analysis are described. A structured document analysis service or system is described that associates keys and values in images of structured documents based on key, value, and key-value container bounding boxes. A machine learning model (e.g., a convolutional neural network) analyzes images of structured documents (e.g., forms) to identify bounding boxes for keys, values, and key-value containers in the images. For each image, duplicate bounding boxes are removed, and then a set of key-value containers are selected and sorted based on confidence scores from the neural network. For each selected key-value container, a best key and value are determined for the container based on overlap of the key and value bounding boxes with the container bounding box and confidence scores from the neural network; the key bounding box and the value bounding box are associated as a key-value pair in the image.

In some embodiments, optical character recognition (OCR) may be performed on an image in parallel with the above method to determine word boxes including text in the image. The word boxes may be matched with bounding boxes for the key-value pairs in the image to generate and output structured document data (key-value pairs with text) for the document. As an alternative, in some embodiments, after the key-value pairs are determined for an image, OCR may be performed on the bounding boxes of the key-value pairs in the image to generate and output structured document data (key-value pairs with text) for the document.

Structured document may include any document such as forms and receipts that include a layout of keys associated with values. Keys are fields that a structured document contains such as "Name", "Age", "Address", "SSN", "Wages", etc. The response of a person to each of these keys is considered a "value". For example, the value for the key "Name" could be "Jane Doe". To automatically read and understand structured documents, the keys and their corresponding values need to be extracted and stored as a key-value pair.

For instance, in the above example the key-value pair is (Name, Jane Doe).

Conventional techniques for reading structured documents use OCR to infer the various words in the documents, classify the words as keys or values, and finally attempt to associate the keys to their corresponding values. However, these conventional techniques have shortcomings. For one, OCR techniques capture textual information in a document, but may not preserve or capture spatial or graphical information for the document. OCR techniques generally do not capture location information for the text, nor do they capture graphical information such as cell boundaries. This spatial or graphical information may be useful in identifying key-value pairs. Another shortcoming of OCR is that a typical OCR implementation may be configured to capture and interpret characters in a given alphabet/character set (e.g., English/Arabic), but may not be configured to capture and interpret text in other languages, alphabets, or character sets (e.g., Russian/Cyrillic, Chinese, Japanese, Greek, etc.).

Embodiments of the methods and apparatus for structured document analysis as described herein may leverage machine learning models (e.g., convolutional neural networks (CNNs)) for object detection directly from images of the structured documents. Each structured document is treated as an image from which geometric objects of three categories—keys, values, and key-value containers—are extracted. Key-value containers are image regions that contain both a key and its corresponding value. Embodiments may implement an automated approach to determine bounding boxes for image regions that contain keys and their corresponding values (referred to as key-value container bounding boxes), to determine bounding boxes for the keys and values, and to match values with keys using the container bounding boxes. This allows embodiments to generate and output key-value pairs for images of structured documents such as forms by matching words extracted from the images using OCR with the key and value bounding boxes in the images, or alternatively by performing OCR on the key and value bounding boxes in the images.

In some embodiments, for a large dataset of structured documents, ground truth annotations are obtained for the three categories of objects—keys, values and key-value containers—in the documents. A machine learning model (e.g., a CNN object detection model) is trained using this data as a training set. Real-world structured documents may then be analyzed by the trained model. The output of the model for each structured document consists of bounding boxes with a most probable category and a confidence score for each bounding box. A bounding box indicates an image region, for example as an X/Y coordinate and width and height for the region, or alternatively as X/Y coordinates indicating corners or vertices of the region. To retrieve the list of key-value pairs from the bounding boxes, embodiments may apply the following method:

1) Perform a non-maximum suppression (NMS) technique on the bounding boxes obtained as output from the model to remove duplicates (i.e., highly overlapping bounding boxes).
2) Obtain all the bounding boxes from step 1 that are determined as key-value containers with high confidence (i.e., with confidence scores above a pre-determined threshold) and sort the determined key-value containers based on the confidence scores for the container bounding boxes.
3) For each key-value container bounding box (e.g., starting with the key-value container bounding box with the highest confidence score), identify the best key and value for the container by:
   a) Sorting the keys based on a score derived from two metrics i) the overlap between the key bounding box and the key-value container bounding box, and ii) the confidence score of the key bounding box. The score may, for example, be a weighted average of the two metrics.
   b) Selecting the key with the maximum score as the key associated with the key-value container.
   c) Sorting the values based on a score derived from two metrics i) the overlap between the value bounding box and the key-value container bounding box, and ii) the confidence score of the value bounding box. The score may, for example, be a weighted average of the two metrics.
   d) Selecting the value with the maximum score as the value associated with the key-value container.

The output is a list of key-value pairs (with bounding boxes) for the image. Embodiments may maintain lists of container, key, and value bounding boxes to be processed, and in some embodiments may remove a container bounding box and the key and value bounding boxes identified for that container bounding box from the lists once the key-value pair has been identified so that the bounding boxes are not considered in future iterations of the method.

In some embodiments, OCR may be performed on an image in parallel with the above method to determine word boxes including text in the image. After step (3) of the method, the word boxes may be matched with key bounding boxes returned in (b) and value bounding boxes returned in (d) to generate and output structured document data (key-value pairs with text). As an alternative, in some embodiments, after the key-value pairs are determined for the image, OCR may be performed in the image on the key bounding boxes returned in (b) and the value bounding boxes returned in (d) to generate and output structured document data (key-value pairs with text).

In some embodiments, the OCR output text may be cleaned up using language models trained on ground truth textual data for the structured documents.

Embodiments may overcome shortcomings of conventional methods by capturing spatial information (e.g., bounding boxes) for objects in the image and leveraging that spatial information to associate keys and values as key-value pairs in the image. In addition, embodiments may process structured documents that contain characters or strings from any alphabet, character set, or language to associate keys with their corresponding values, as embodiments leverage spatial information and do not depend on textual information to make the associations between keys and values in the image. Another advantage of embodiments is that text content such as words in text fields and headers may be automatically excluded from consideration as candidates for keys and values because the machine learning model does not classify those regions as container bounding boxes, or if container bounding boxes are identified in those regions they tend to be ruled out as possible container bounding boxes by the bounding box analysis method.

Figure 6:
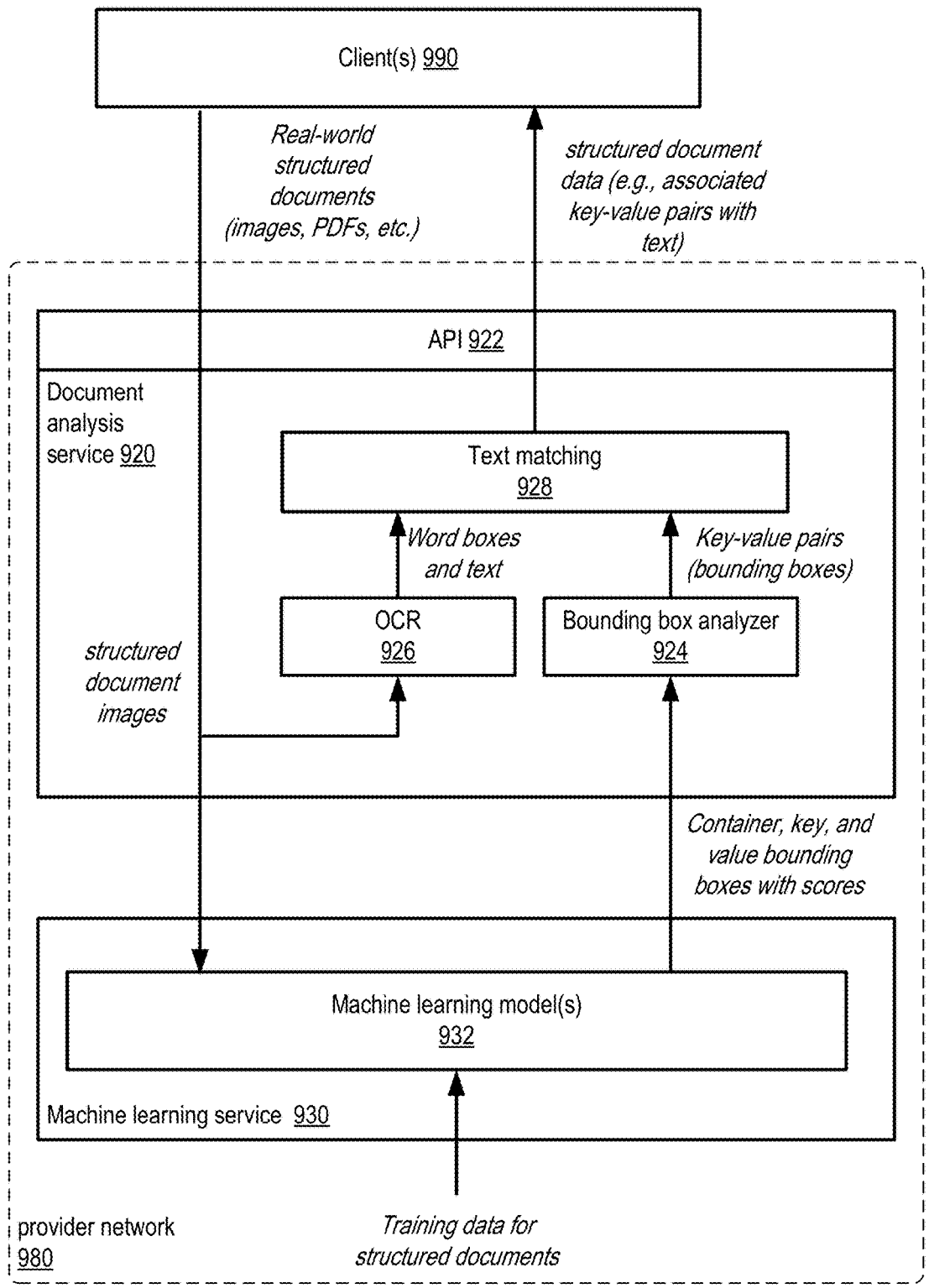
FIG. 6 illustrates an example cloud-based document analysis service, according to some embodiments.

Embodiments of the structured document analysis system may, for example, be implemented as a service in a provider network to analyze real-world structured documents (e.g., forms) using convolutional neural networks. A provider network may, for example, be a network set up by an entity such as a company or a public sector organization to provide one or more services accessible via the Internet (such as various types of cloud-based computing or storage) to a distributed set of clients or customers. A provider network may include one or more data centers hosting various resource pools, such as collections of physical and virtualized computer servers, storage devices, networking equipment and the like, needed to implement and distribute the services offered by the provider. An example provider network implementations of embodiments is illustrated in FIG. 6. An example provider network in which embodiments may be implemented is illustrated in FIGS. 7 through 10.

While embodiments are described that leverage convolutional neural networks to classify key-value container, key, and value bounding boxes in structured documents to be processed by a key-value association module, note that other types of machine learning models may be used in some embodiments.

FIGS. 1A through 1E illustrate a structured document analysis system, according to some embodiments. FIG. 1A shows a high-level architecture of a structured document analysis system 100, according to some embodiments. A structured document analysis system 100 may, for example, be implemented on a network (e.g., a provider network as illustrated in FIGS. 6 through 10). The system 100 may include one or more computing devices on the network that implement a machine learning model 110 (e.g., a convolutional neural network (CNN)) a bounding box analyzer 120, an optical character recognition (OCR) engine 160, and a text matching component 170. An example computing system that may be used in embodiments is shown in FIG. 11.

Machine learning model 110 (e.g., a convolutional neural network) may be trained with ground truth data for keys, values, and key-value containers in structured documents. The ground truth data may, for example, be generated by annotating real-world examples of a particular type of form that a client or user of system 100 wants to analyze using the system 100. After training, the machine learning model 110 may be used to analyze real-world structured documents 10 input to the system 100. The real-world structured documents 10, may, for example, be a bulk collection of a form that has been filled out by people, for example customers of the client or user of system 100. As a non-limiting real-world example, the client may be a national, state, or local taxing entity, and the structured documents 10 may be tax forms. Note, however, that any type of structured document (forms, receipts, etc.) may be processed by system 100.

The structured documents 10 may be received from a document source (e.g., a computing system or network of a client of the system 100). The structured documents 10 may, for example, include scanned digital images or PDFs of paper forms that were filled out by customers of the client. However, the structured documents 10 may instead or also include digital forms that were filled out by customers of the client.

The received structured documents 10 may be input as images to the machine learning model 110 for analysis. For each document 10 image, the machine learning model 110 may determine bounding boxes in the image for categories of elements of the structured documents including keys, values, and key-value containers. A key-value container is a region in an image that may contain a key and its corresponding value. A bounding box indicates an image region, for example as an X/Y coordinate and width and height for the region, or alternatively as X/Y coordinates indicating corners or vertices of the region. A category and a confidence score for the category classification is assigned to each determined bounding box. For each document 10 image, the machine learning model 110 outputs container, key, and value bounding boxes with scores 20 to the bounding box analyzer 120. The bounding box analyzer 120 analyzed the input information 20 to associate values with keys based on the container bounding boxes, and outputs the determined key-value pairs with their bounding boxes 30 to the text matching component 170. FIGS. 1B through 1E further describe the analysis performed by the bounding box analyzer 120. FIGS. 2A and 2B illustrate a method that may be performed to analyze bounding boxes at 120.

Referring to FIG. 1A, the received structured documents 10 may also be input as images to an OCR engine 160 that, for each input image, performs optical character recognition on the image to extract word bounding boxes containing text from the image. A word bounding box indicates an image region that includes at least one word, number, character, or string of characters, for example as an X/Y coordinate and width and height for the region, or alternatively as X/Y coordinates indicating corners or vertices of the region. The word bounding boxes with text 60 may be output to the text matching 170 component.

For each image, the text matching 170 component receives key-value pairs with bounding boxes 30 from the bounding box analyzer 120 and word bounding boxes with text 60 from the OCR engine 160. The text matching 170 component associates the word bounding boxes output by the OCR engine 160 for the image with the bounding boxes for the keys and values in the key-value pairs output by the bounding box analyzer 120 for the image to generate and output structured document data (key-value pairs with textual content) for the image. A word bounding box may be associated with a particular key or value if the word bounding box is at least in part contained in the key or value bounding box. Note that some key or value bounding boxes may include more than one word bounding box, and that in some cases a key or value bounding box may be empty (i.e., not containing a word bounding box). In addition, in some cases, a word bounding box may not be contained in, and thus is not associated with, a key or value in the image.

Figure 1B:
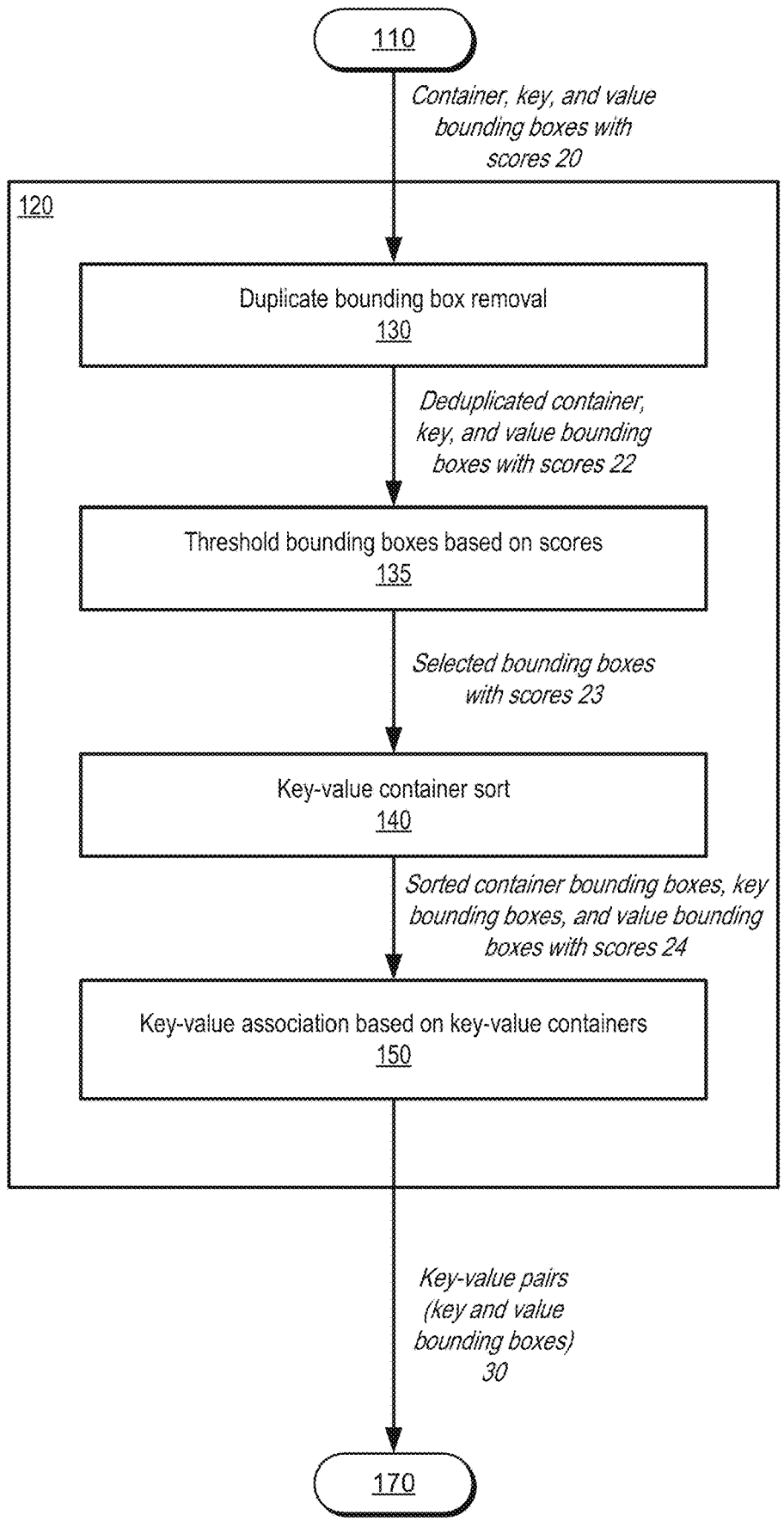
Figure 2A:
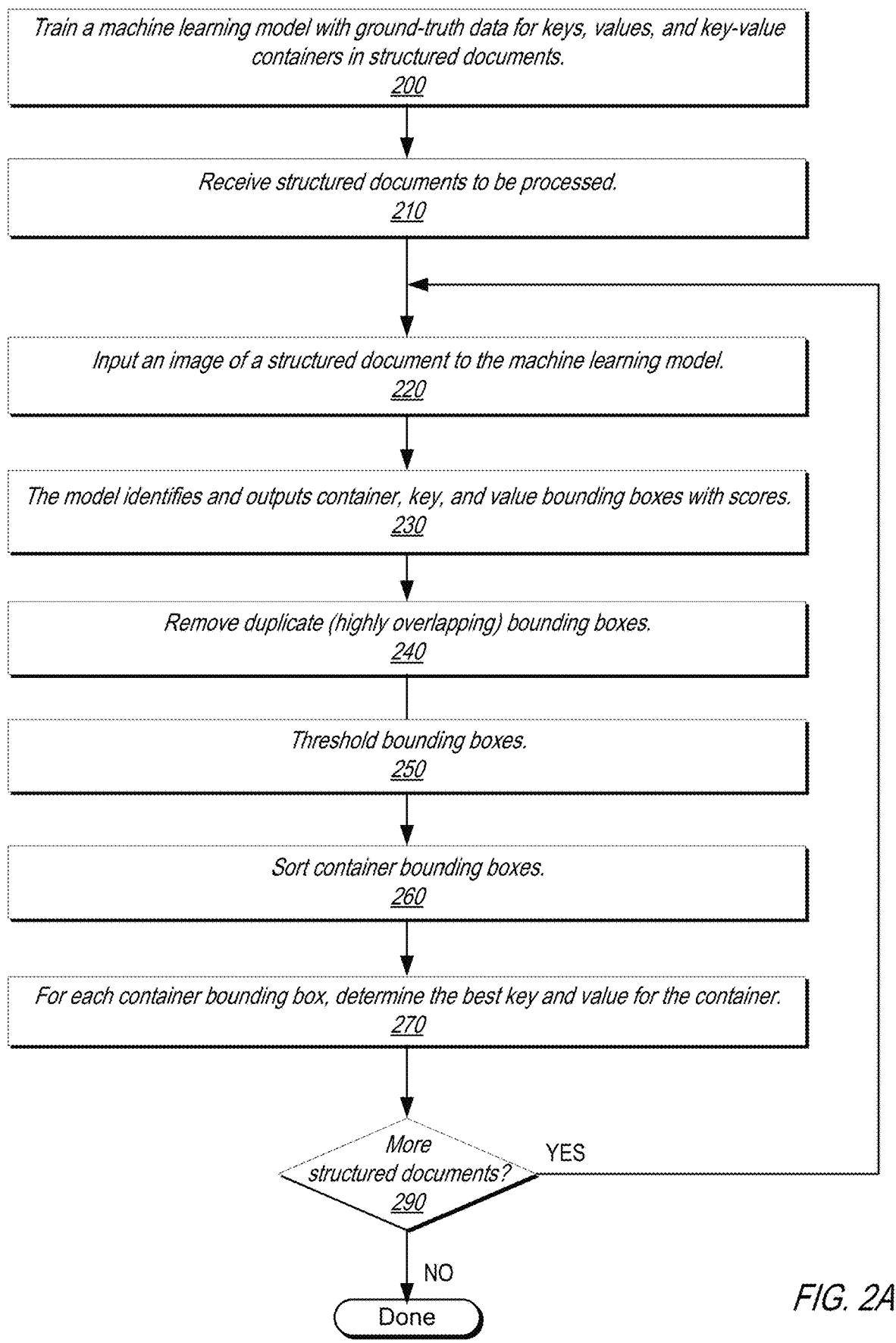
FIGS. 2A and 2B are flowcharts of a method for analyzing structured documents, according to some embodiments.
Figure 2B:
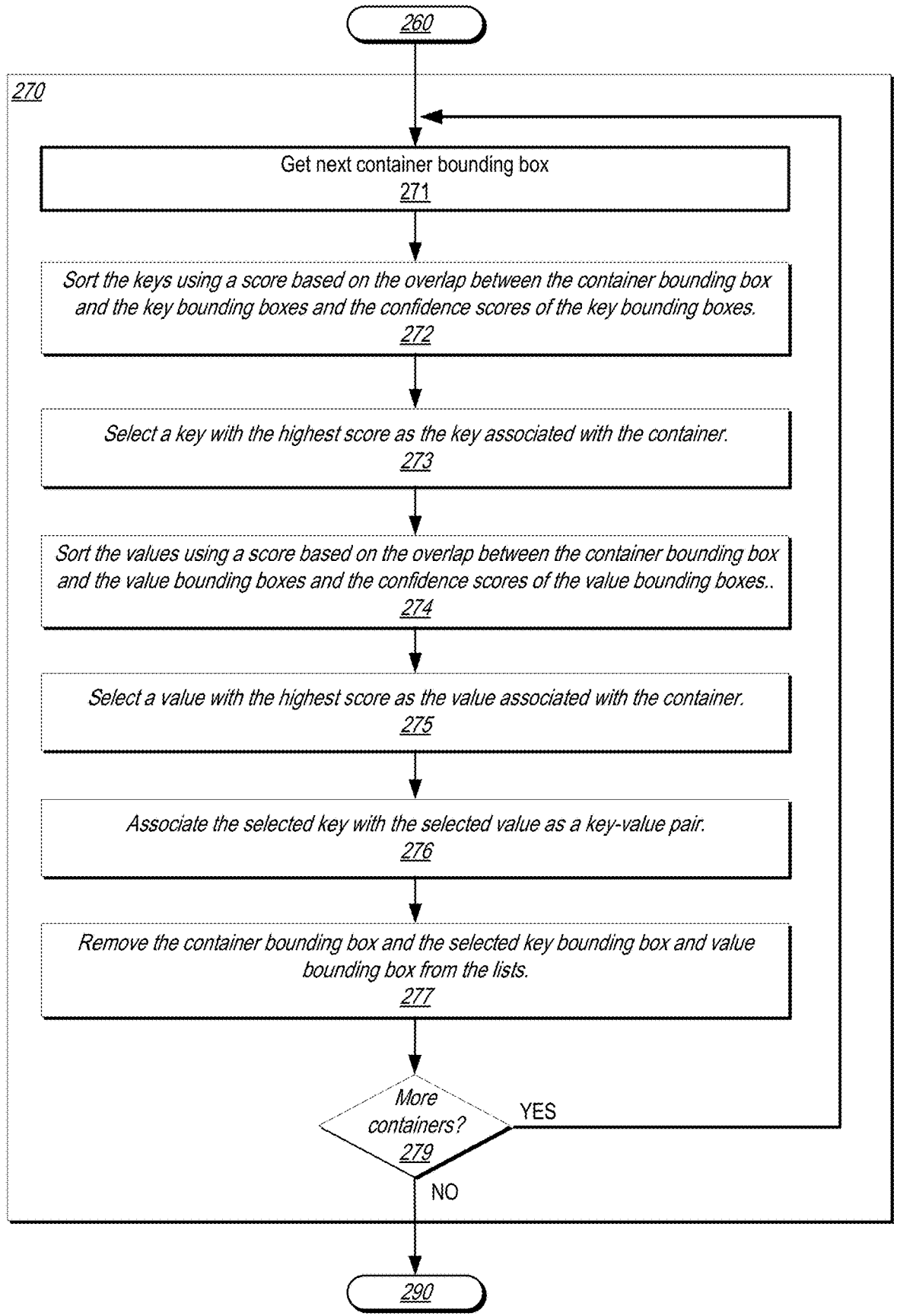

FIG. 1B expands on the bounding box analyzer 120 component of FIG. 1A, according to some embodiments. At 130, for each image, analyzer 120 may remove duplicate (i.e., highly overlapping) bounding boxes from the lists of key, value, and container bounding boxes 20 received from the machine learning model 110 to output deduplicated container, key, and value bounding boxes with scores 22. In some embodiments, a non-maximum suppression (NMS) technique may be implemented at 130 to remove the duplicate bounding boxes. As an example using container bounding boxes, the list of container bounding boxes may be sorted by confidence scores and overlap. Groups of two or more of the bounding boxes may be identified that overlap each other by an amount that is over a specified threshold. The container bounding box in an overlapped group that has the highest confidence score may be selected, and the other bounding boxes in the group may be discarded or suppressed.

At 135, a thresholding process is performed on the deduplicated container, key, and value bounding boxes with scores 22 to discard or suppress bounding boxes for which the confidence scores are below a specified threshold to output selected lists of key, value, and container bounding boxes 23.

Figure 1C:
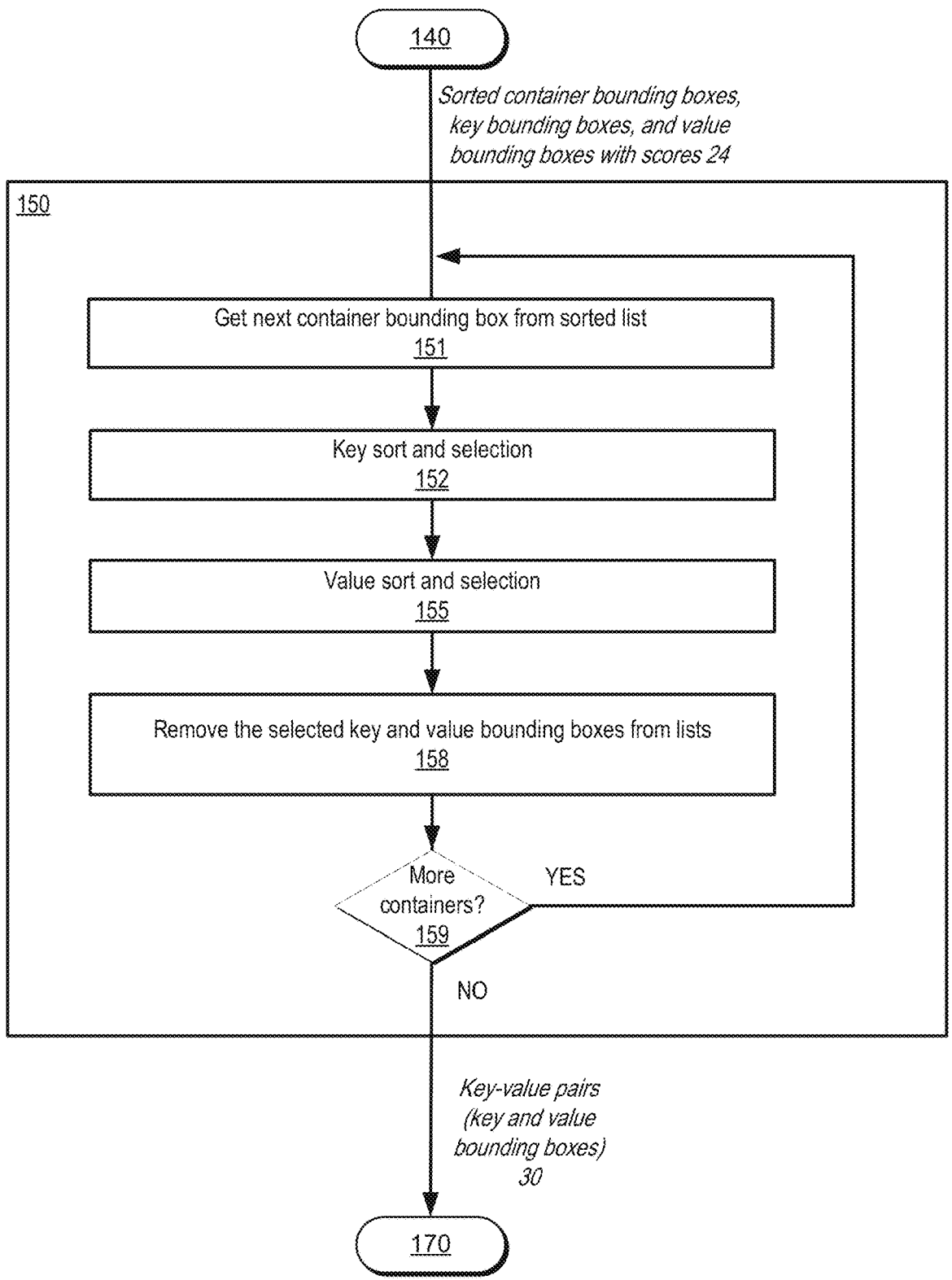
Figure 1D:
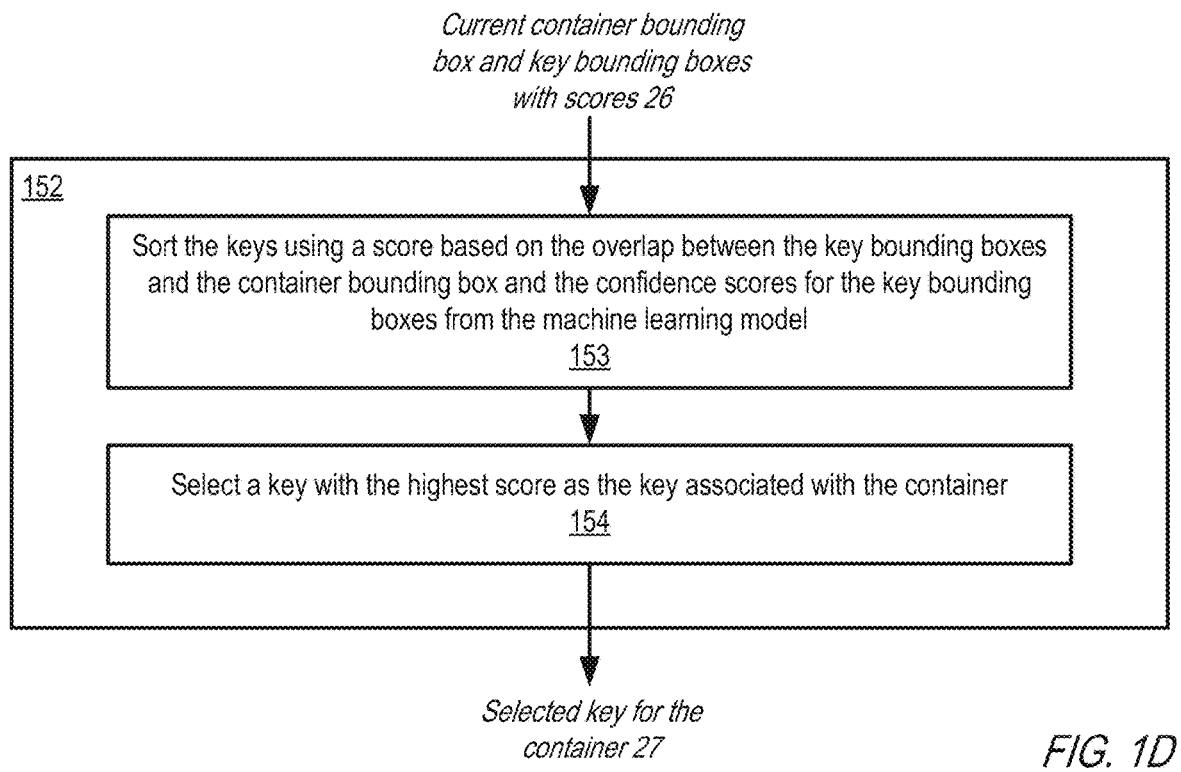
Figure 1E:
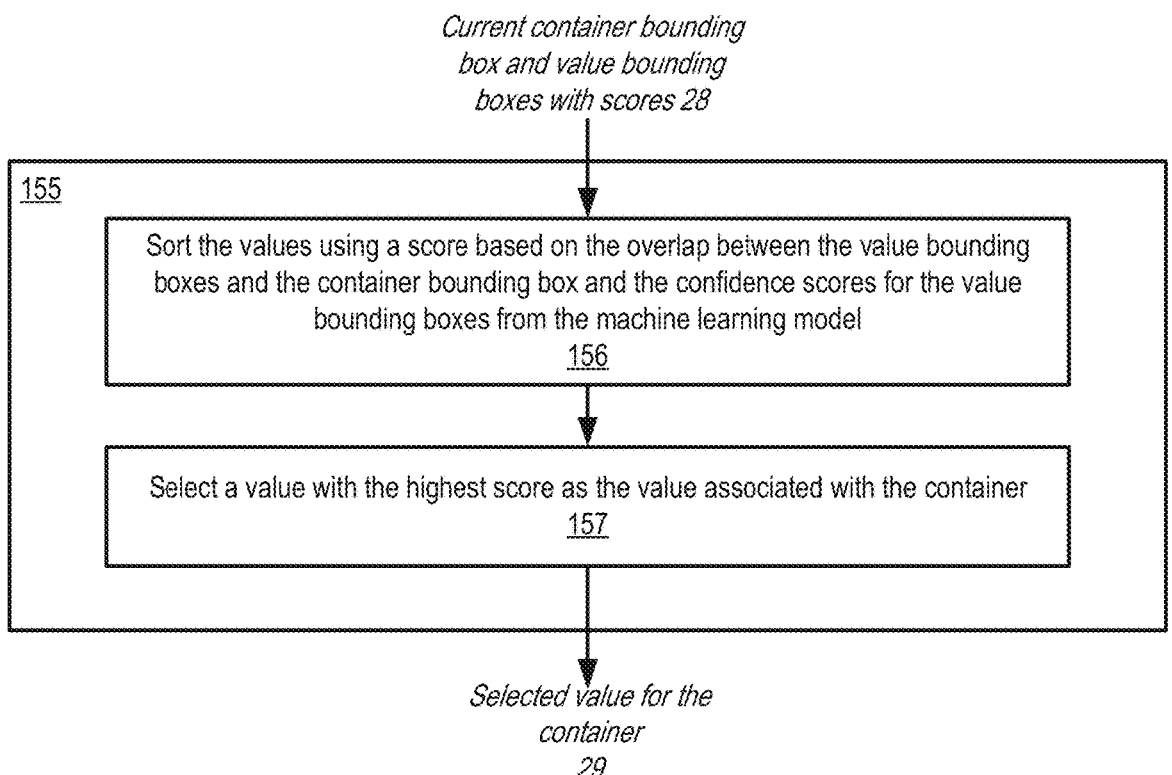

At 140, the deduplicated container bounding boxes output by 130 are sorted based on their confidence scores. The sorted list of container bounding boxes and the lists of key and value bounding boxes with confidence scores 24 are input to a key-value association process 150. Key-value association 150 matches values to keys based on the key-value containers to output key-value pairs 30 with their bounding boxes for the image to the text matching 170 process. FIGS. 1C through 1E further describe the processing performed at 150 of FIG. 1B.

FIG. 1C expands on the key-value association 150 process of FIG. 1B, according to some embodiments. In some embodiments, the sorted list of container bounding boxes may be processed in key-value association 150 beginning at the highest confidence container bounding box, and descending down the sorted list of container bounding boxes. At 151, a next container bounding box is obtained from the list. At key sort and selection 152, a key is determined for the current container bounding box. FIG. 1D expands on element 152. At 155, a value is determined for the current container bounding box. FIG. 1E expands on element 155.

At 158, the determined key and value bounding boxes are removed from the lists so that they are not considered as candidate keys and values for future containers. At 159, if there are more containers in the sorted list of container bounding boxes to be processed, the processing returns to element 151 to get the next container bounding box from the list. The key-value pairs 30 with their bounding boxes that were determined for the image are output to the text matching 170 process.

FIG. 1D expands on element 152 of FIG. 1C, according to some embodiments. The current container bounding box and the list of key bounding boxes with confidence scores are input to 152. At 153, the list of keys is sorted for the current container based on a score that is a combination of the overlap between the key bounding boxes and the current container bounding box and the confidence scores for the key bounding boxes. For example, for each key bounding box in the list, a weighted average of an amount of overlap between the key bounding box and the current container bounding box and the confidence score for the key bounding box may be determined, and the list of key bounding boxes may then be sorted based on the weighted average. At 154, the key bounding box with the highest score (e.g., weighted average) may be selected as the key associated with the current container bounding box. The selected key 27 for the current container is output.

FIG. 1E expands on element 155 of FIG. 1C, according to some embodiments. The current container bounding box and the list of value bounding boxes with confidence scores are input to 155. At 156, the list of values is sorted for the current container based on a score that is a combination of the overlap between the value bounding boxes and the current container bounding box and the confidence scores for the value bounding boxes. For example, for each value bounding box in the list, a weighted average of an amount of overlap between the value bounding box and the current container bounding box and the confidence score for the value bounding box may be determined, and the list of value bounding boxes may then be sorted based on the weighted average. At 157, the value bounding box with the highest score (e.g., weighted average) may be selected as the value associated with the current container bounding box (and thus associated with the selected key 27). The selected value 29 for the current container is output.

FIGS. 2A and 2B are flowcharts of a method for analyzing structured documents, according to some embodiments. The methods described in FIGS. 2A and 2B may, for example, be implemented by bounding box analyzer 120 of FIG. 1A or bounding box analyzer 520 of FIG. 5.

Referring to FIG. 2A, as indicated at 200, a machine learning model may be trained with ground truth data for keys, values, and key-value containers in structured documents. In some embodiments, the machine learning model may be a convolutional neural network. However, other machine learning models may be used. After training 200, the machine learning model may be used to analyze real-world structured documents.

As indicated at 210, structured documents to be analyzed are received. An image of each received structured document may be analyzed by elements 220 through 270 to generate key-value pairs (key and value bounding boxes) for the image. The key-value pairs for the image may then be processed by text matching 170 of FIG. 1A or by OCR 560 of FIG. 5 to provide textual content for the key-value pairs.

As indicated at 220, an image of a structured document is input to a machine learning model for analysis. The machine learning model may determine bounding boxes in the image for categories of elements of the structured document including keys, values, and key-value containers. A key-value container is a region in an image that may contain a key and its corresponding value. A bounding box indicates an image region, for example as an X/Y coordinate and width and height for the region, or alternatively as X/Y coordinates indicating corners or vertices of the region. A category (key, value, or container) and a confidence score for the category classification is assigned to each determined bounding box. As indicated at 230, the machine learning model identifies and outputs key-value container bounding boxes, key bounding boxes, and value bounding boxes for the image, along with confidence scores for the classifications.

As indicated at 240, duplicate (i.e., highly overlapping) bounding boxes are removed from the lists of key, value, and container bounding boxes received from the machine learning model. In some embodiments, a non-maximum suppression (NMS) technique may be used to remove the duplicate bounding boxes. As an example using container bounding boxes, the list of container bounding boxes may be sorted by confidence scores and overlap. Groups of two or more of the bounding boxes may be identified that overlap each other by an amount that is over a specified threshold. The container bounding box in an overlapped group that has the highest confidence score may be selected, and the other bounding boxes in the group may be discarded or suppressed As indicated at 250, in some embodiments, bounding boxes for which the confidence score is below a specified threshold may be discarded. A thresholding process may be performed on the deduplicated container, key, and value bounding boxes to discard or suppress bounding boxes for which the confidence scores are below a specified threshold. As indicated at 260, in some embodiments, the remaining key-value container bounding boxes may be sorted based on their confidence scores.

As indicated at 270, for each key-value container bounding box, the best key and value for the container bounding box is determined. A key-value association method matches values to keys based on the key-value containers to output key-value pairs with their bounding boxes for the image. FIG. 2B expands on element 270 of FIG. 2A.

At 290 of FIG. 2A, if there are more structured documents to be processed, the method returns to element 220 to input and process the next image. Otherwise, the method is done until more structured documents are received to be processed.

Figure 5:
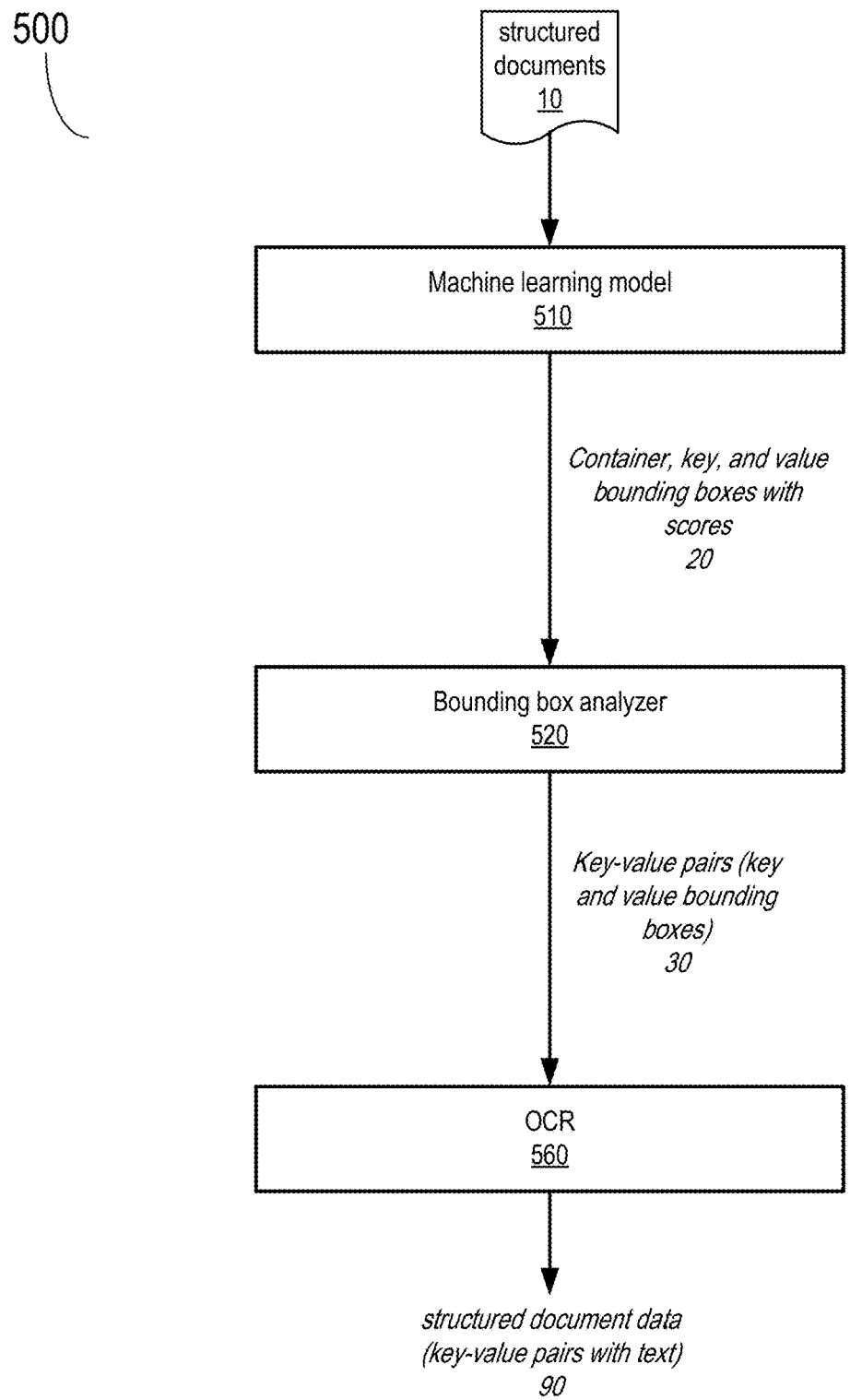
FIG. 5 illustrates an alternative architecture for a structured document analysis system, according to some embodiments.

As illustrated in FIG. 1A, in some embodiments, optical character recognition (OCR) may be performed on an image in parallel with the above method to determine word boxes including text in the image. The word boxes may be matched with bounding boxes for the key-value pairs in the image to generate and output structured document data (key-value pairs with text) for the document. As an alternative as illustrated in FIG. 5, in some embodiments, after the key-value pairs are determined for an image, OCR may be performed on the bounding boxes of the key-value pairs in the image to generate and output structured document data (key-value pairs with text) for the document.

FIG. 2B expands on element 270 of FIG. 2A. In some embodiments, the sorted list of container bounding boxes may be processed in element 270 beginning at the highest confidence container bounding box, and descending down the sorted list of container bounding boxes. At 271, a next container bounding box to be processed is obtained from the sorted list of container bounding boxes.

As indicated at 272, the keys are sorted using a score based on the overlap between the current container bounding box and the key bounding boxes and the confidence scores of the key bounding boxes. For example, for each key bounding box in the list, a weighted average of an amount of overlap between the key bounding box and the current container bounding box and the confidence score for the key bounding box may be determined, and the list of key bounding boxes may then be sorted based on the weighted average. As indicated at 273, a key with the highest score (e.g., weighted average) may be selected as the key associated with the current container bounding box.

As indicated at 274, the values are sorted using a score based on the overlap between the current container bounding box and the value bounding boxes and the confidence scores of the value bounding boxes. For example, for each value bounding box in the list, a weighted average of an amount of overlap between the value bounding box and the current container bounding box and the confidence score for the value bounding box may be determined, and the list of value bounding boxes may then be sorted based on the weighted average. As indicated at 274, a value with the highest score (e.g., weighted average) is selected as the value associated with the container.

As indicated at 276, the selected key and the selected value for the current container bounding box are associated as a key-value pair. As indicated at 277, the current container bounding box is removed from the list of container bounding boxes, and the key and value bounding boxes are removed from the candidate key and value lists so that the bounding boxes are not considered in future iterations of the method. At 279, if there are more containers in the sorted list of container bounding boxes to be processed, the method returns to element 271 to get and process the next container bounding box from the list.

FIGS. 3A through 3D graphically illustrate key-value association using key-value container bounding boxes in an example structured document, according to some embodiments, and are not intended to be limiting.

Figure 3A:
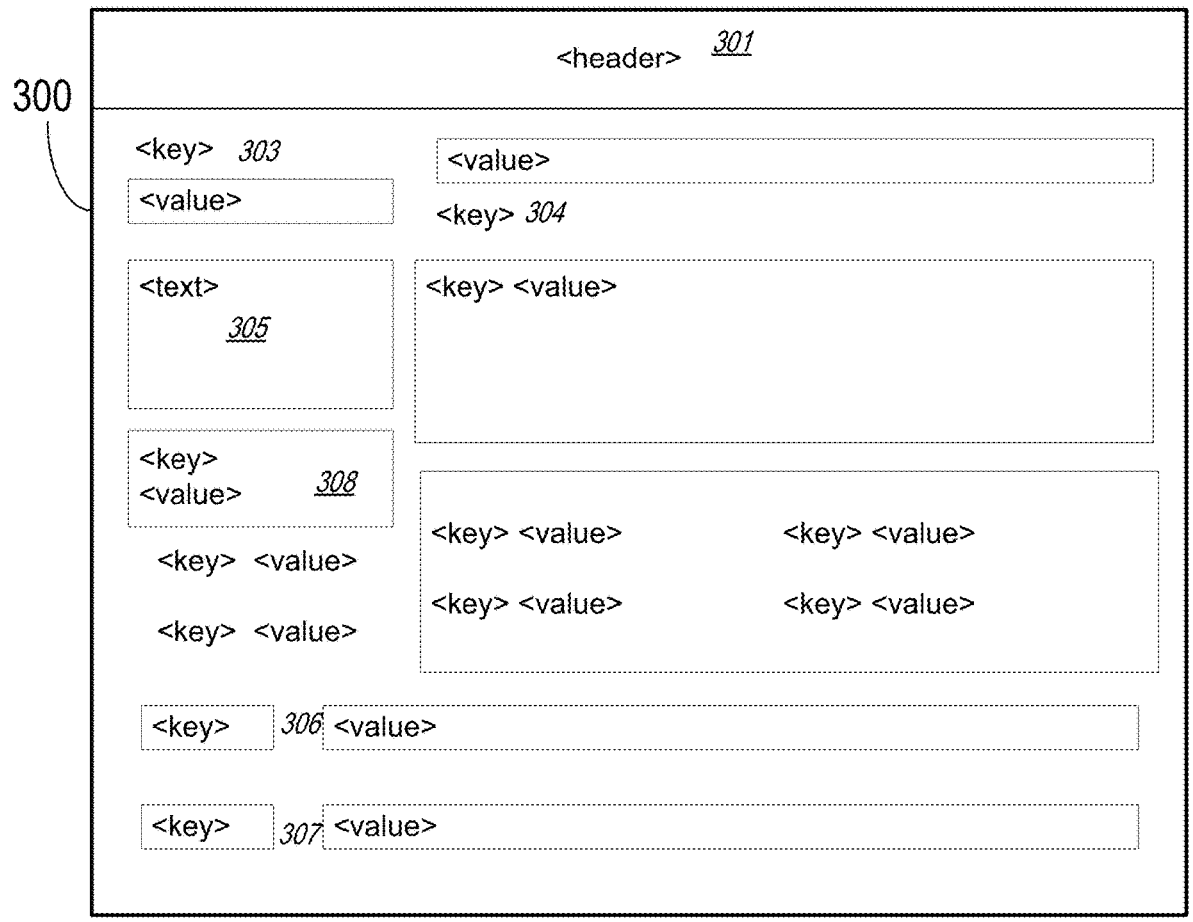
FIGS. 3A through 3D illustrate key-value association using key-value container bounding boxes in an example structured document, according to some embodiments.

FIG. 3A shows an example form document 300. The document 300 may include a header 301 that may, for example include text elements of various types, styles, and sizes. Text area or box 305 may, for example, include text elements (e.g. words, numbers, symbols, etc.) of various types, styles, and sizes. Key-value pairs 303 and 308 are examples in which the key is above the value. Key-value pair 304 is an example in which the key is below the value. Key-value pairs 306 and 307 are examples in which the key and value are in line. In some embodiments, at least one value may be a clickable element such as a checkbox.

As can be seen by the other unlabeled examples, document elements including key-value pairs may be otherwise arranged, enclosed in rectangles, arranged in rows and columns, or in general appear in many different arrangements on a form. The layout, style and content of the elements in a document 300 may vary across a set of structured documents. The keys and values may include one or more text elements of various types, styles, and sizes (words, numbers, symbols, etc.). In particular, the values typically vary across the structured documents. In some cases (i.e., in some of the structured documents), one or more of the value fields may be empty.

Figure 3B:
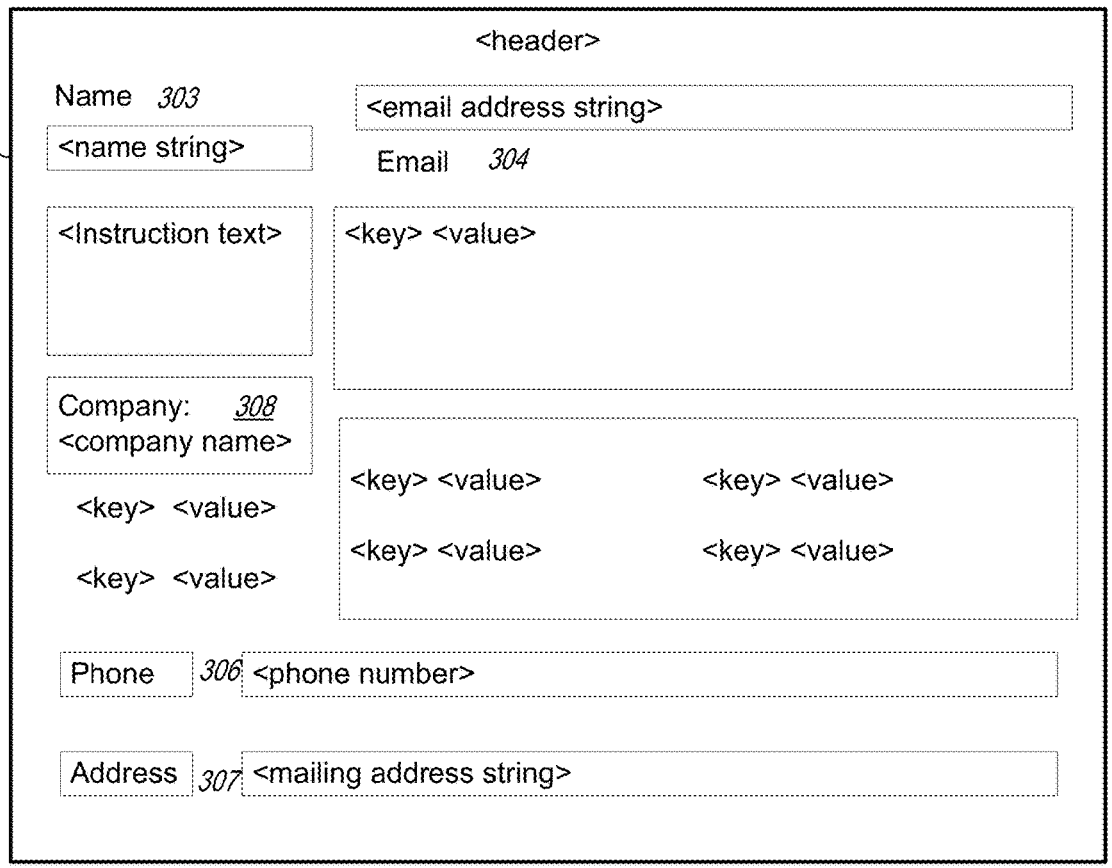

FIG. 3B shows the example form document 300 with example content in some of the key-value pairs. Key-value pair 303 has "Name" as the key and a name string as the value. Key-value pair 308 has "Company" as the key and a company name as the value. Key-value pair 304 has "Email" as the key and an email address as the value. Key-value pair 306 has "Phone" as the key and a phone number as the value. Key-value pair 307 has "Address" as the key and a mailing address as the value.

Figure 3C:
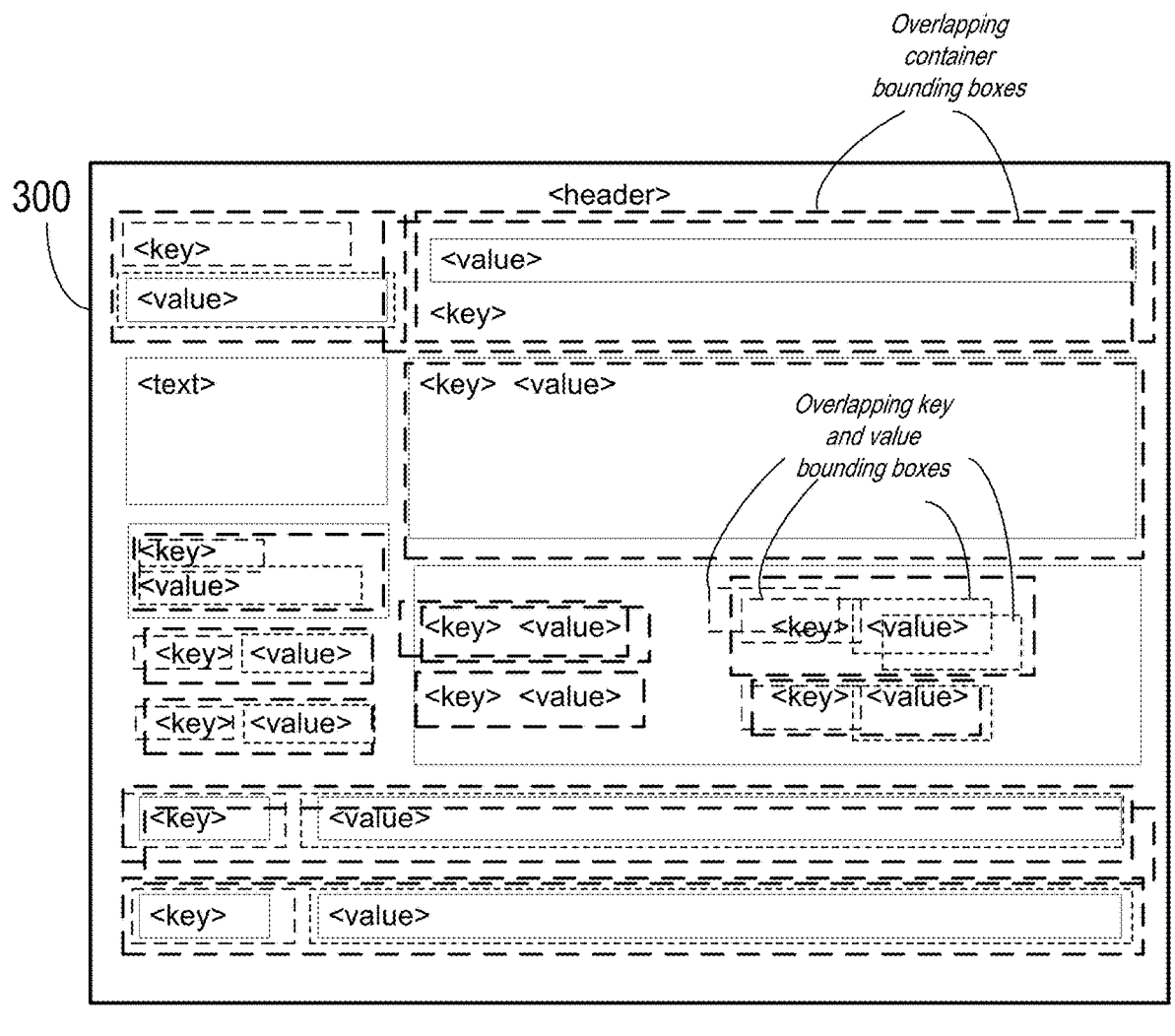

FIG. 3C graphically illustrates example container, key, and value bounding boxes for the example form document 300 that may be determined by analysis of an image of the document 300 performed by a machine learning model such as a convolutional neural network. Note that, for simplicity, bounding boxes for some but not all key-value elements in the image are shown. Some examples of overlapping container, key, and value bounding boxes are shown. Note that, because the machine learning model has been trained on ground truth data for keys, values, and key-value containers for the form 300, bounding boxes are not generated for header, text box, or other elements that are not keys, values, or key-value containers.

Figure 3D:
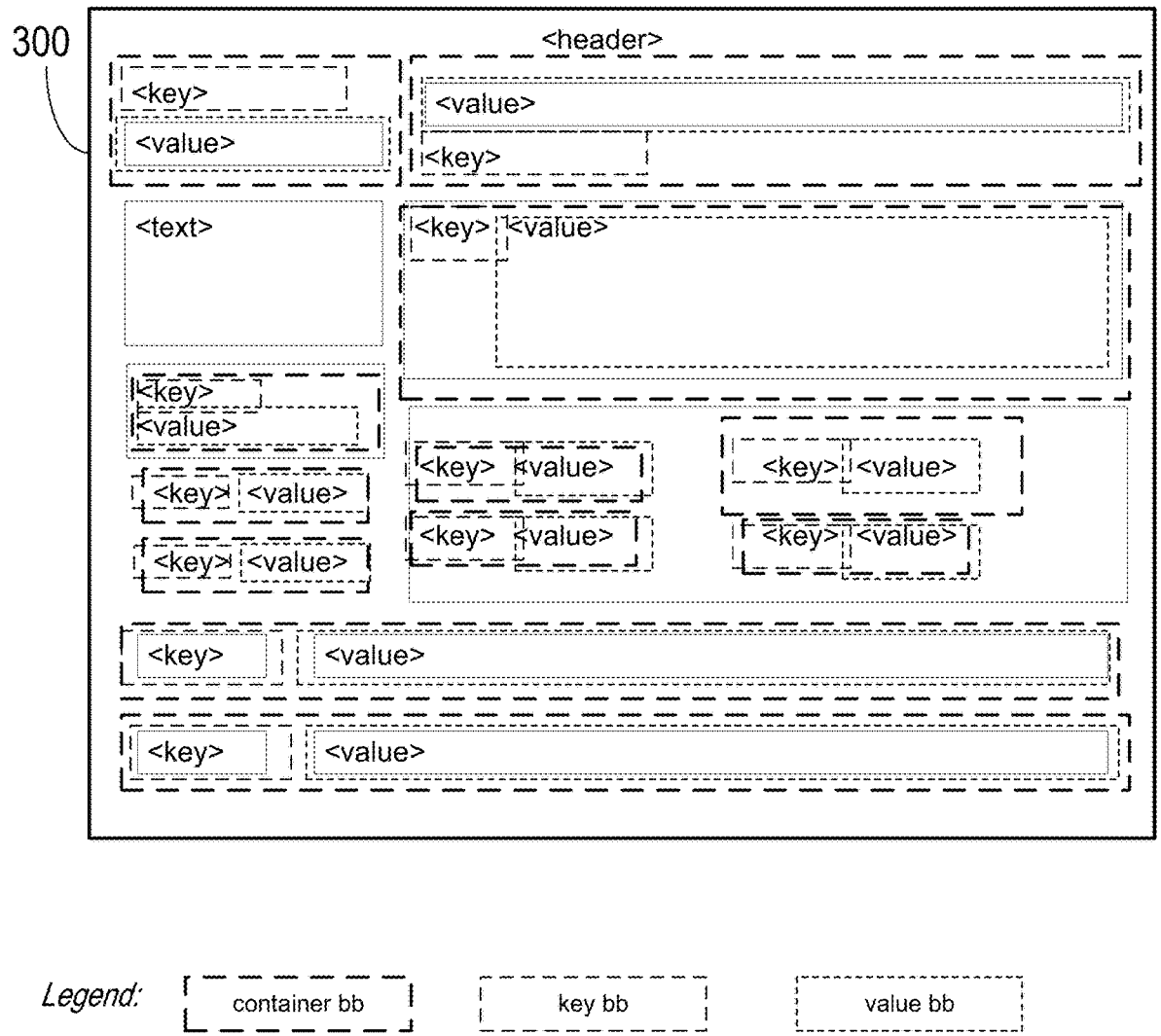

FIG. 3D graphically illustrates the example form document 300 of FIG. 3C with duplicate bounding boxes removed, and shows that a key-value pair has been identified for each bounding box. Again note that bounding boxes are not generated for header, text box, or other elements that are not keys, values, or key-value con FIG. 4 illustrates example output 400 of a structured document analysis system as illustrated in FIGS. 1A through 1E, according to some embodiments. The output 400 may include a list of key-value pairs (keys with their associated values). For example, the key "Name" may be associated with a name string (e.g., "Jane Doe"), the key "Address" may be associated with an address string (e.g., "123 Main Street, Everytown, USA"), and so on.

FIG. 5 illustrates an alternative architecture for a structured document analysis system, according to some embodiments. FIG. 5 shows a high-level architecture of a structured document analysis system 500, according to some embodiments. The structured document analysis system 500 may, for example, be implemented on a network (e.g., a provider network as illustrated in FIGS. 6 through 10). The system 500 may include one or more computing devices on the network that implement a machine learning model 510 (e.g., a convolutional neural network (CNN)) a bounding box analyzer 520, and an optical character recognition (OCR) engine 560. An example computing system that may be used in embodiments is shown in FIG. 11.

Machine learning model 510 (e.g., a convolutional neural network) may be trained with ground truth data for keys, values, and key-value containers in structured documents. The ground truth data may, for example, be generated by annotating real-world examples of a particular type of form that a client or user of system 500 wants to analyze using the system 500. After training, the machine learning model 510 may be used to analyze real-world structured documents 10 input to the system 500. The real-world structured documents 10, may, for example, be a bulk collection of a form that has been filled out by people, for example customers of the client or user of system 500. As a non-limiting real-world example, the client may be a national, state, or local taxing entity, and the structured documents 10 may be tax forms. Note, however, that any type of structured document (forms, receipts, etc.) may be processed by system 500.

The structured documents 10 may be received from a document source (e.g., a computing system or network of a client of the system 500). The structured documents 10 may, for example, include scanned digital images or PDFs of paper forms that were filled out by customers of the client. However, the structured documents 10 may instead or also include digital forms that were filled out by customers of the client.

The received structured documents 10 may be input as images to the machine learning model 510 for analysis. For each document 10 image, the machine learning model 510 may determine bounding boxes in the image for categories of elements of the structured documents including keys, values, and key-value containers. A key-value container is a region in an image that may contain a key and its corresponding value. A bounding box indicates an image region, for example as an X/Y coordinate and width and height for the region, or alternatively as X/Y coordinates indicating corners or vertices of the region. A category and a confidence score for the category classification is assigned to each determined bounding box. For each document 10 image, the machine learning model 510 outputs container, key, and value bounding boxes with scores 20 to the bounding box analyzer 520. The bounding box analyzer 520 analyzed the input information 20 to associate values with keys based on the container bounding boxes, and outputs the determined key-value pairs with their bounding boxes 30 to the OCR 560 engine. FIGS. 2A and 2B illustrate a method that may be performed to analyze bounding boxes at 520.

In the system 100 shown in FIG. 1A, OCR is performed on an entire image in parallel with the machine learning model and bounding box analyzer processing the image, and a text matching process then matches word boxes output by the OCR with key and value bounding boxes determined by the bounding box analysis to generate and output structured document data (key-value pairs with text) for the image. In the alternative system 500 as shown in FIG. 5, an OCR engine 560 performs optical character recognition on the bounding boxes of the key-value pairs 30 in the image that are output by bounding box analyzer 520 to generate and output structured document data (key-value pairs with text) for the image.

FIG. 6 illustrates an example cloud-based structured document analysis system, according to some embodiments. Embodiments of the structured document analysis system may, for example, be implemented as a service 920 on a provider network 980 to analyze real-world structured documents such as forms and receipts using machine learning models 932 (e.g., convolutional neural networks) to generate structured document data (e.g., associated key-value pairs with text) for the documents. The machine learning models 932 may be implemented by a machine learning service 930 on the provider network 980. The machine learning models 932 may be trained using ground truth data for the structured documents to be analyzed.

Client(s) 990 may provide real-world structured documents (e.g., as images, PDF files, etc.) to the document analysis service 920 via an application programming interface (API) 922. Document analysis service 920 may provide images of the structured documents to machine learning service 930 to be analyzed using a machine learning model 932. Results of the analysis (container, key, and value bounding boxes with scores) may be passed back to the document analysis service 920, which may perform key-value association and optical character recognition techniques on images of structured documents as described herein to identify and output structured document data (e.g., associated key-value pairs with text). In some embodiments, OCR 926 is performed on an entire image in parallel with the machine learning model 932 and bounding box analyzer 924 processing of the image, and a text matching 928 process then matches word boxes output by the OCR 926 with key and value bounding boxes determined by the bounding box analyzer 924 to generate and output structured document data (key-value pairs with text) for the image. In an alternative system as shown in FIG. 5, an OCR engine performs optical character recognition on the bounding boxes of the key-value pairs in the image that are output by the bounding box analyzer to generate and output structured document data (key-value pairs with text) for the image.

Example Provider Network Environment

This section describes example provider network environments in which embodiments of the methods and apparatus described in reference to FIGS. 1 through 6 may be implemented. However, these example provider network environments are not intended to be limiting.

Figure 7:
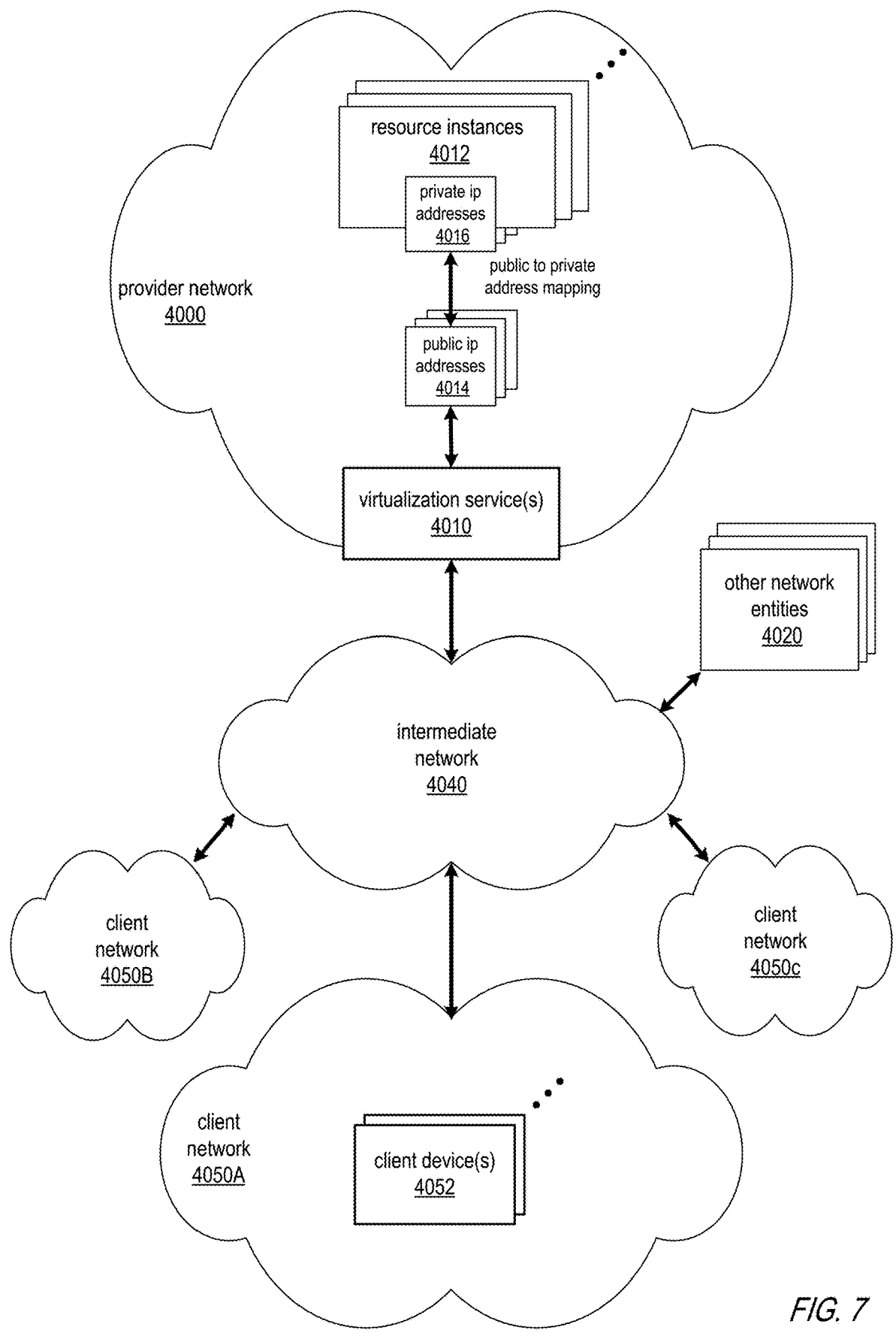
FIG. 7 illustrates an example provider network environment, according to some embodiments.

FIG. 7 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 8:
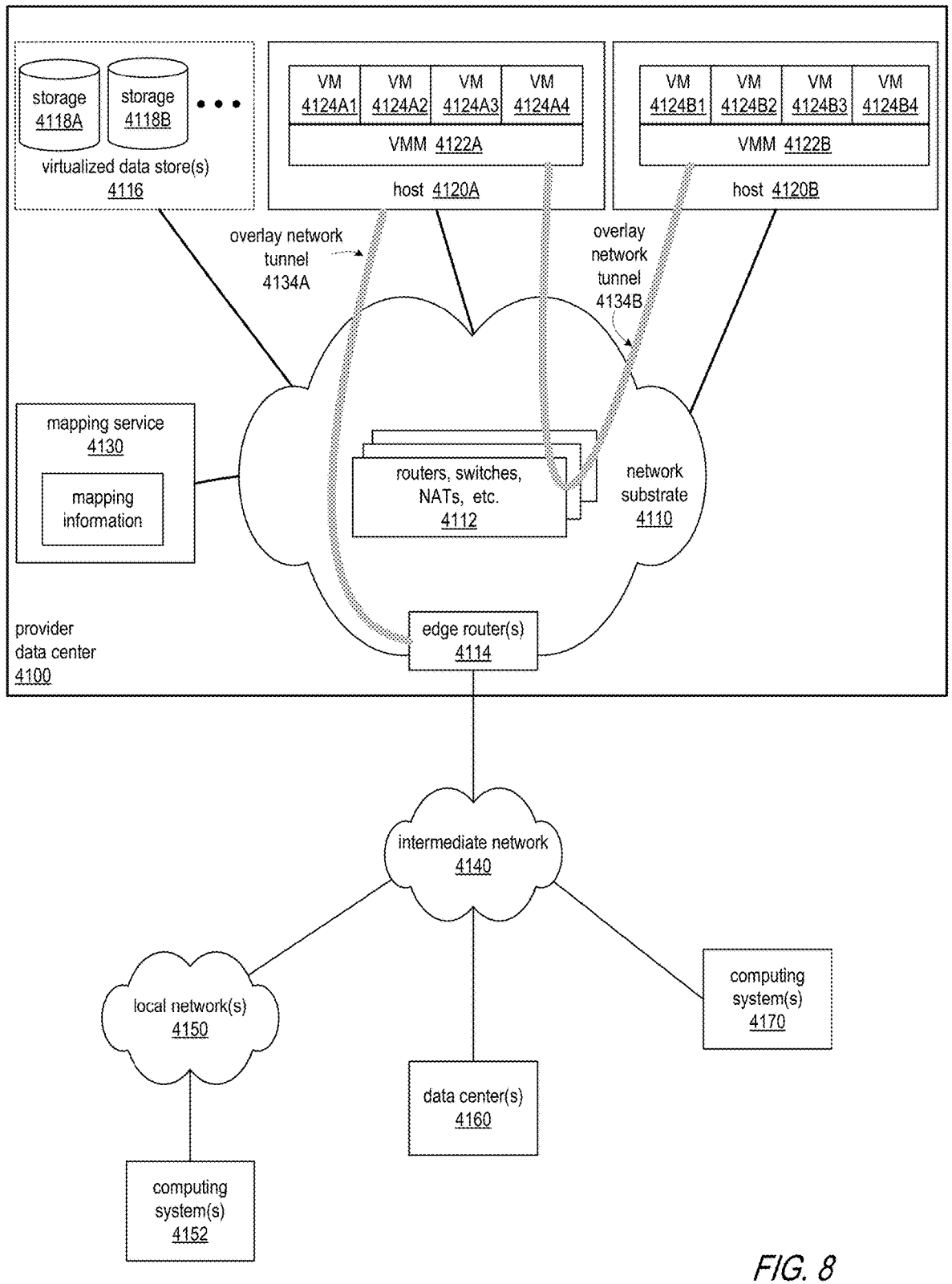
FIG. 8 illustrates an example data center that implements an overlay network on a network substrate using IP tunneling technology, according to some embodiments.

FIG. 8 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 8) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 8, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 8, at least some networks in which embodiments may be implemented may include hardware virtualization technology that enables multiple operating systems to run concurrently on a host computer (e.g., hosts 4120A and 4120B of FIG. 8), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 8 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

In some embodiments, instead of or in addition to providing hardware virtualization technology that enables multiple operating systems to run concurrently on host computers as virtual machines (VMs) on the hosts, container technology may be leveraged to provide containers to clients of the network provider. Container technology is a virtualization technology that allows applications to be developed as containers that can be deployed to and executed in container-based virtualization environments provided by container platforms on host machines, for example on one or more hosts 4120 in a provider data center 4100. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple containers to run on a single OS instance. A primary difference between containers and VMs is that containers provide a way to virtualize an OS in order for multiple workloads to run on a single OS instance, whereas with VMs, the hardware is virtualized to run multiple OS instances.

Figure 9:
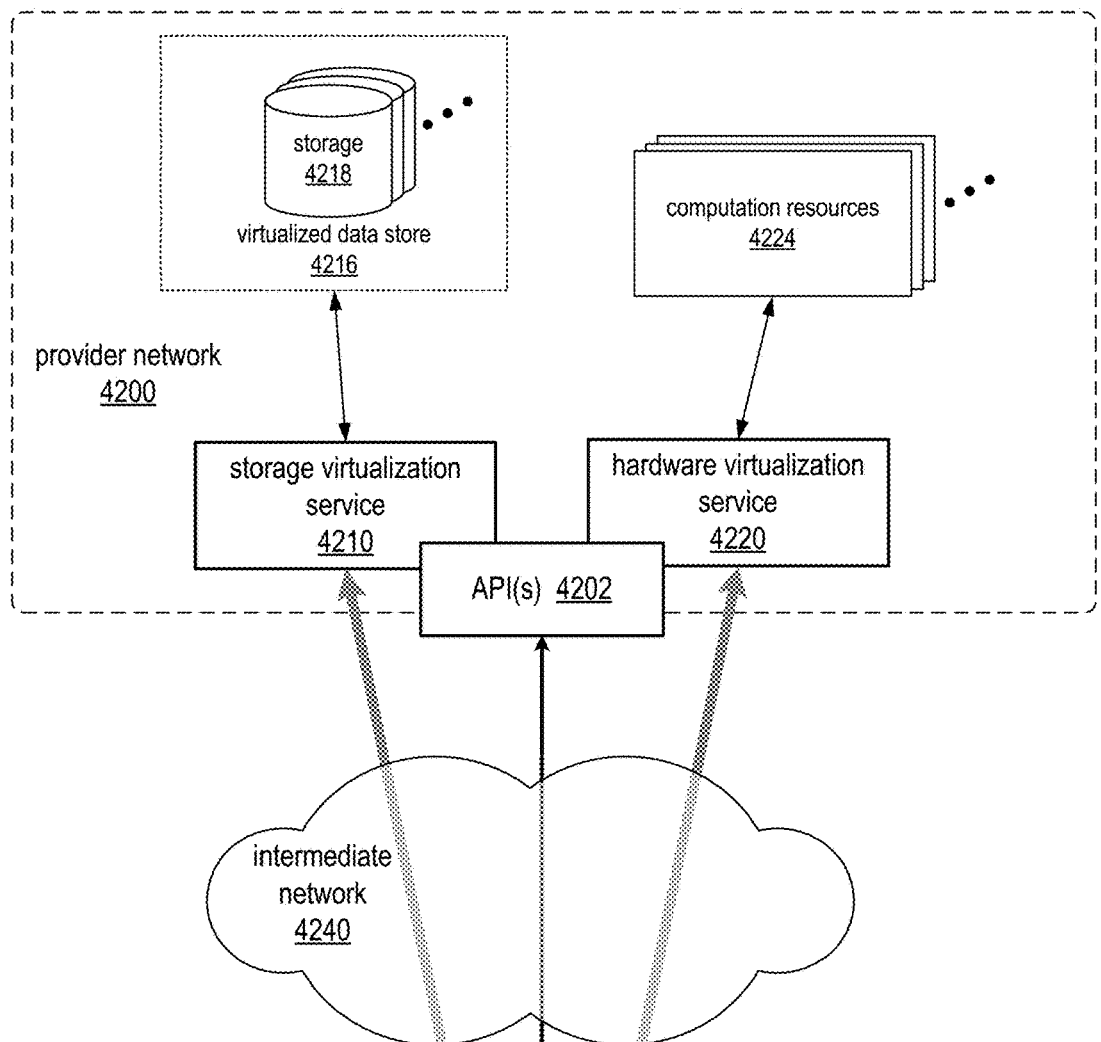
FIG. 9 is a block diagram of an example provider network that provides a storage virtualization service and a hardware virtualization service to clients, according to some embodiments.
Figure 9:
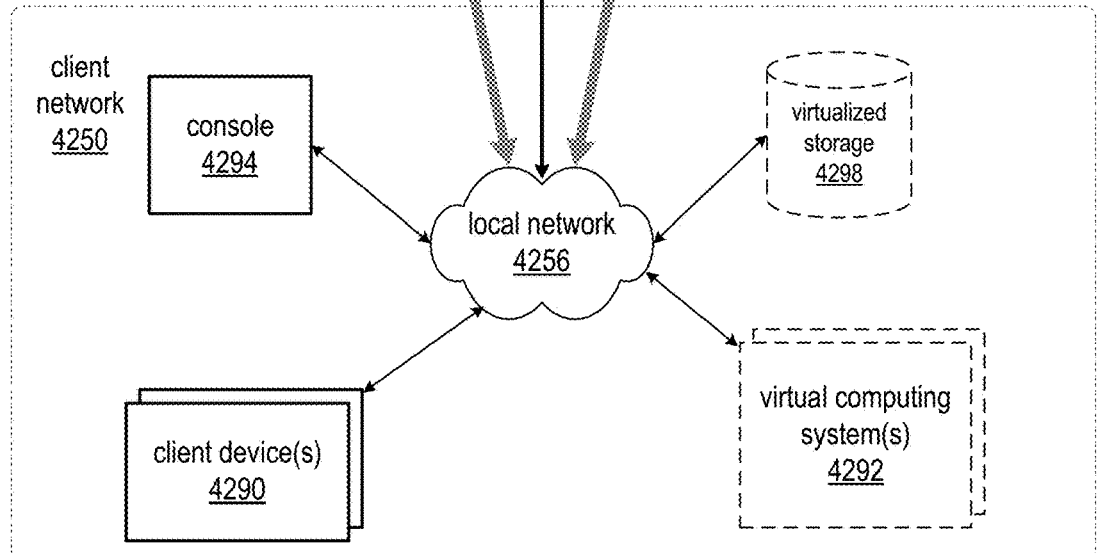

FIG. 9 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 9, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 10:
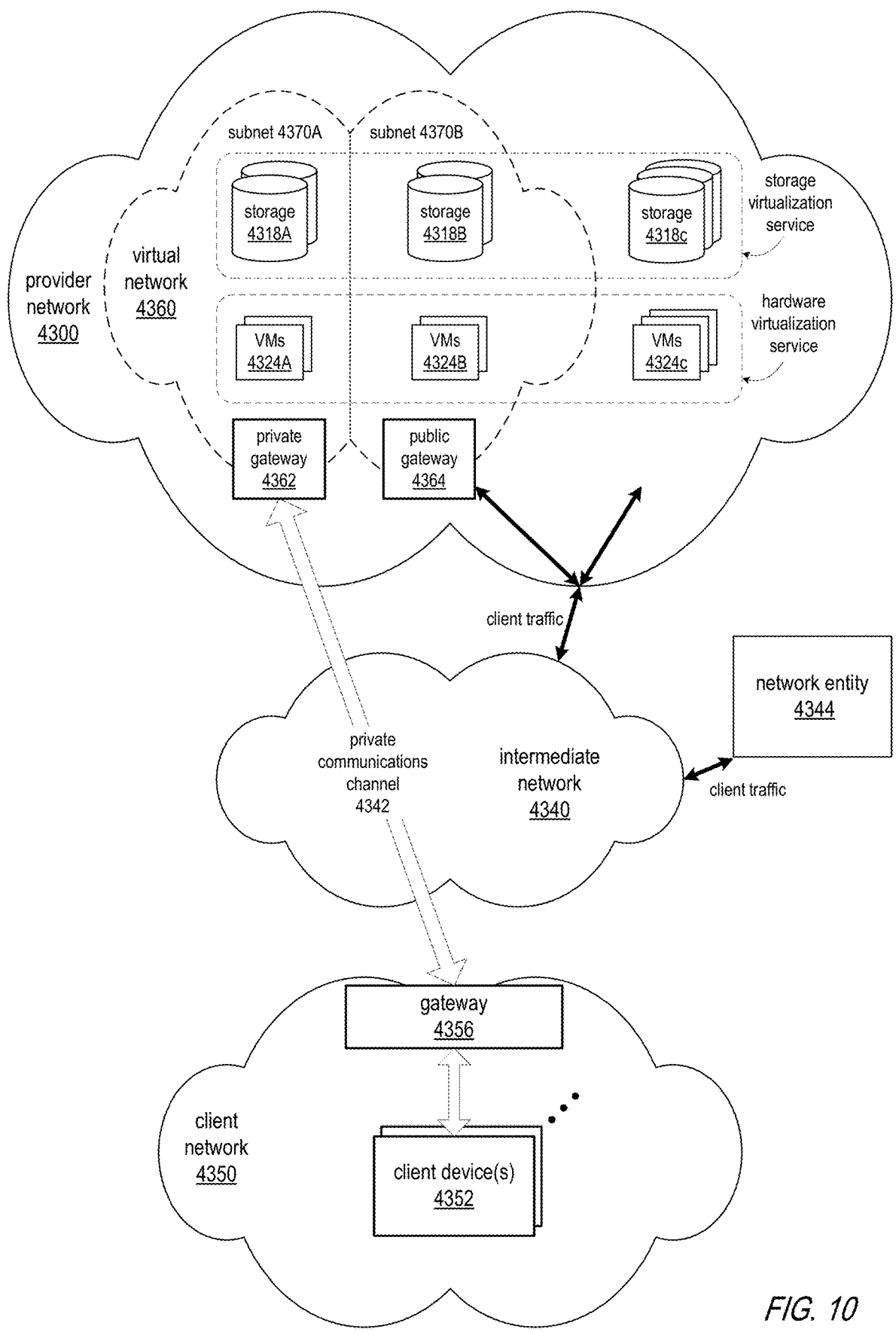
FIG. 10 illustrates an example provider network that provides virtual networks to at least some clients, according to some embodiments.
Figure 11:
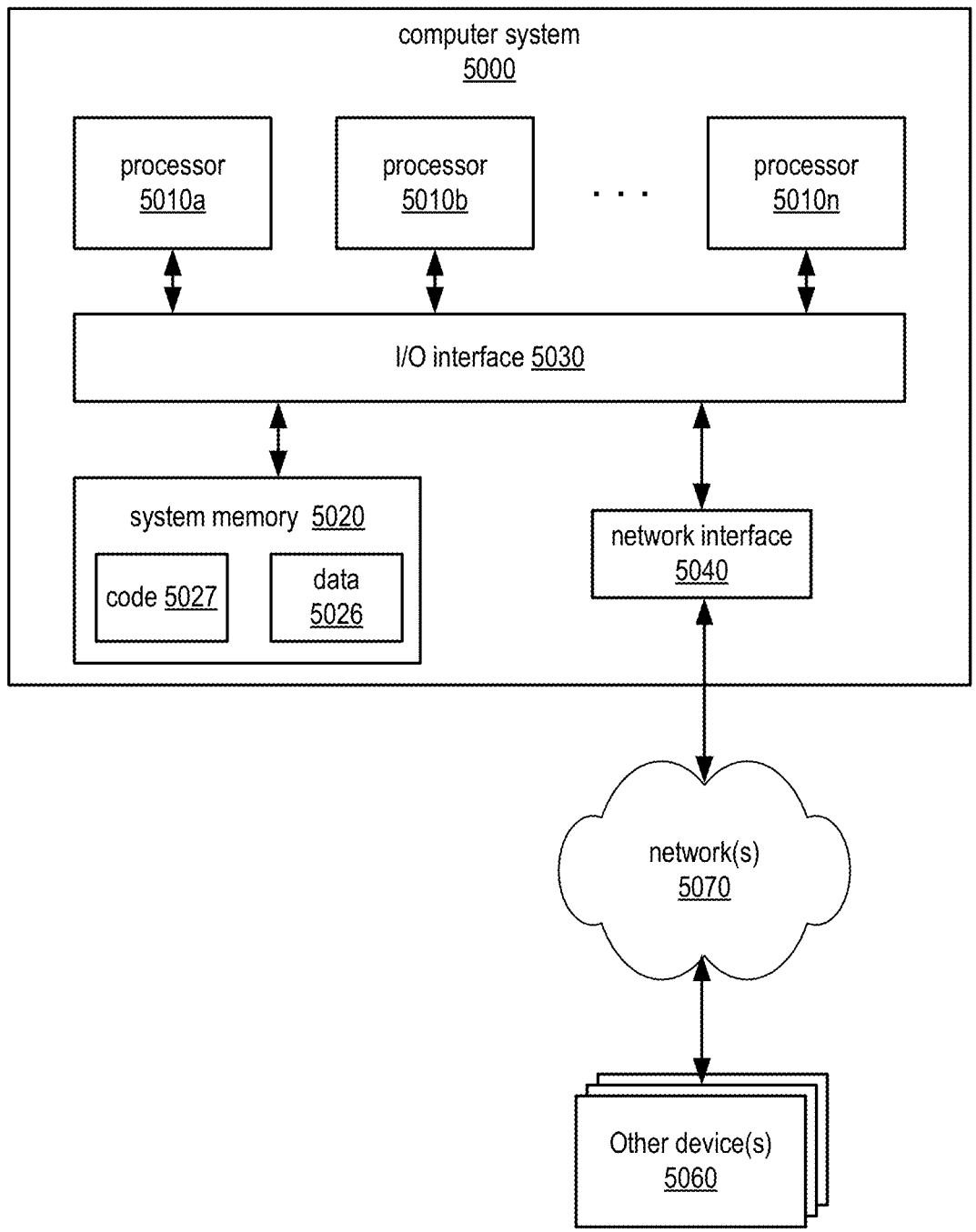
FIG. 11 is a block diagram illustrating an example computer system that may be used in some embodiments.

FIG. 10 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 10 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 10 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

In some embodiments, a system that implements a portion or all of the methods and apparatus for providing a structured document analysis system as described herein may include a general-purpose computer system that includes or is configured to access one or more computer-accessible media, such as computer system 5000 illustrated in FIG. 11. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 11 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 10, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 6 for providing a structured document analysis system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices on a network that implement:
   a bounding box analyzer; and
   a convolutional neural network configured to:
   receive images representing structured documents containing key-value pairs;
   analyze the images to determine bounding boxes in the images for categories of elements of the structured documents, wherein the categories of elements include keys, values, and key-value containers, wherein a key-value container is a region in an image that contains a key and its corresponding value;
   assign a category and a confidence score to each determined bounding box; and
   output the categorized bounding boxes to the bounding box analyzer;
   wherein the bounding box analyzer is configured to, for each image processed by the convolutional neural network:
   remove duplicate bounding boxes;
   select key-value container bounding boxes for which the confidence scores are above a specified threshold and sort the key-value container bounding boxes according to the confidence scores to generate a sorted list of key-value container bounding boxes; and
   for each key-value container bounding box in the list, determine a key bounding box and a value bounding box for the key-value container bounding box, wherein the key bounding box and the value bounding box are associated as a key-value pair in the image.

2. The system as recited in claim 1, wherein, to remove duplicate bounding boxes, the bounding box analyzer applies a non-maximum suppression technique to the bounding boxes for the image received from the neural network.

3. The system as recited in claim 1, wherein, to determine a key bounding box and a value bounding box for a key-value container bounding box, the bounding box analyzer is configured to:
   sort the key bounding boxes according to a weighted average of determined overlap scores for the key bounding boxes with the key-value container bounding box and the confidence scores for the key bounding boxes;
   select the key bounding box with the highest weighted average as the key bounding box for the key-value container bounding box;
   sort the value bounding boxes according to a weighted average of determined overlap scores for value bounding boxes with the key-value container bounding box and the confidence scores for the value bounding boxes; and
   select the value bounding box with the highest weighted average as the value bounding box for the key-value container bounding box.

4. The system as recited in claim 1, wherein the one or more computing devices further implement:
   an optical character recognition (OCR) process configured to perform optical character recognition on the images to extract word boxes containing text from the images; and
   a text matching process configured to, for each image, associate the word boxes output by the OCR process for the image with the bounding boxes for the keys and values in the key-value pairs output by the bounding box analyzer for the image to generate key-value pairs with textual content for the image.

5. The system as recited in claim 1, wherein the one or more computing devices further implement an optical character recognition (OCR) system, wherein the bounding box analyzer is configured to output the key bounding boxes and the value bounding boxes associated as key-value pairs for an image to the OCR, wherein the OCR system is configured to, for each key bounding box and value bounding box associated as a key-value pair in the image:
  perform optical character recognition on the key bounding box and the value bounding box to obtain text content for the respective key and value; and
  output the text content for the respective key and value as a key-value pair.

6. A method, comprising:
  performing, by a service implemented by one or more devices on a network:
    analyzing an image representing a structured document containing key-value pairs to determine bounding boxes in the image and confidence scores for each determined bounding box, wherein the bounding boxes include bounding boxes for keys, values, and key-value containers in the image, wherein a key-value container is a region in the image that contains a key and its corresponding value; and
    processing the determined bounding boxes to determine key bounding boxes and value bounding boxes within respective ones of the key-value container bounding boxes in the image, wherein a key bounding box and a value bounding box within a key-value container bounding box are associated as a key-value pair in the image.

7. The method as recited in claim 6, wherein said analyzing an image representing a structured document containing key-value pairs to determine bounding boxes for elements in the image comprises inputting the image to a machine learning model implemented by one or more devices on the network and trained to analyze images representing the structured document to determine bounding boxes for elements in the images.

8. The method as recited in claim 7, wherein the machine learning model performs:
  analyzing the image to determine bounding boxes in the image for categories of elements of the structured document, wherein the categories of elements include keys, values, and key-value containers; and
  assigning a category and a confidence score to each determined bounding box.

9. The method as recited in claim 7, wherein the machine learning model is a convolutional neural network.

10. The method as recited in claim 6, wherein said processing the determined bounding boxes comprises:
  removing duplicate bounding boxes;
  selecting key-value container bounding boxes for which the confidence scores are above a specified threshold and sorting the selected key-value container bounding boxes according to the confidence scores; and
  for each selected key-value container bounding box, determining a key bounding box and a value bounding box for the key-value container bounding box, wherein the key bounding box and the value bounding box are associated as a key-value pair in the image.

11. The method as recited in claim 10, wherein removing duplicate bounding boxes comprises applying a non-maximum suppression technique to the bounding boxes for the image.

12. The method as recited in claim 10, wherein determining a key bounding box and a value bounding box for a key-value container bounding box comprises:
  sorting the key bounding boxes according to a weighted average of overlap scores for the key bounding boxes with the key-value container bounding box and confidence scores for the key bounding boxes;
  selecting the key bounding box with the highest weighted average as the key bounding box for the key-value container bounding box;
  sorting the value bounding boxes according to a weighted average of overlap scores for value bounding boxes with the key-value container bounding box and confidence scores for the value bounding boxes; and
  selecting the value bounding box with the highest weighted average as the value bounding box for the key-value container bounding box.

13. The method as recited in claim 6, further comprising:
  performing optical character recognition on the image to extract word boxes containing text from the image; and
  associating the word boxes with the bounding boxes for the keys and values in the key-value pairs to generate key-value pairs with textual content for the image.

14. The method as recited in claim 6, further comprising, for each key bounding box and value bounding box associated as a key-value pair in the image:
  performing optical character recognition on the key bounding box and the value bounding box to generate text content for the respective key and value; and
  outputting the text content for the respective key and value as a key-value pair.

15. A non-transitory computer-readable storage medium storing program instructions that when executed on a computing device cause the computing device to:
  analyze images representing structured documents containing key-value pairs to determine bounding boxes in the image and confidence scores for each determined bounding box, wherein the bounding boxes include bounding boxes for keys, values, and key-value containers in the image, wherein a key-value container is a region in an image that contains a key and its corresponding value; and
  for each image, process the determined bounding boxes to determine key bounding boxes and value bounding boxes within respective ones of the key-value container bounding boxes in the image, wherein a key bounding box and a value bounding box within a key-value container bounding box are associated as a key-value pair in the image.

16. The non-transitory computer-readable storage medium as recited in claim 15, wherein, to analyze an image representing a structured document containing key-value pairs to determine bounding boxes for elements in the image, the program instructions when executed on the computing device cause the computing device to input the image to a convolutional neural network trained to analyze images representing the structured documents to determine bounding boxes for elements in the images.

17. The non-transitory computer-readable storage medium as recited in claim 16, wherein the convolutional neural network:
  analyzes the image to determine bounding boxes in the image for categories of elements of the structured document, wherein the categories of elements include keys, values, and key-value containers; and
  assigns a category and a confidence score to each determined bounding box.

18. The non-transitory computer-readable storage medium as recited in claim 15, wherein, to process the determined bounding boxes, the program instructions when executed on the computing device cause the computing device to:
- apply a non-maximum suppression technique to the bounding boxes for the image to remove duplicate bounding boxes;
- select key-value container bounding boxes for which the confidence scores are above a specified threshold; and
- for each selected key-value container bounding box, determine a key bounding box and a value bounding box for the key-value container bounding box, wherein the key bounding box and the value bounding box are associated as a key-value pair in the image.

19. The non-transitory computer-readable storage medium as recited in claim 15, wherein, to determine a key bounding box and a value bounding box for a key-value container bounding box, the program instructions when executed on the computing device cause the computing device to:
- sort the key bounding boxes according to a weighted average of overlap scores for the key bounding boxes with the key-value container bounding box and confidence scores for the key bounding boxes;
- select the key bounding box with the highest weighted average as the key bounding box for the key-value container bounding box;
- sort the value bounding boxes according to a weighted average of overlap scores for value bounding boxes with the key-value container bounding box and confidence scores for the value bounding boxes; and
- select the value bounding box with the highest weighted average as the value bounding box for the key-value container bounding box.

20. The non-transitory computer-readable storage medium as recited in claim 15, wherein the program instructions when executed on the computing device cause the computing device to, for each key bounding box and value bounding box associated as a key-value pair in the image:
- perform optical character recognition on the key bounding box and the value bounding box to generate text content for the respective key and value; and
- output the text content for the respective key and value as a key-value pair.

* * * * *